Figure 1:
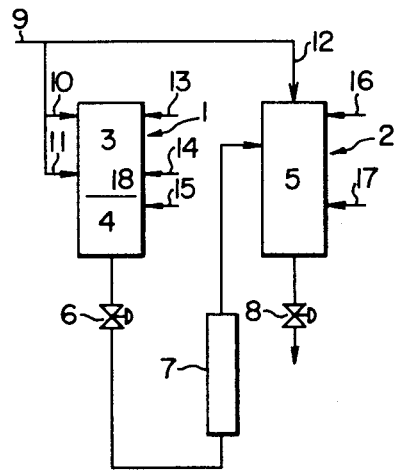

United States Patent [19]

Tomura et al.

[11] 4,271,280
[45] Jun. 2, 1981

[54] PROCESS FOR PRODUCING POLYETHYLENE

[75] Inventors: Yasushi Tomura, Chiba; Fujio Sakuma, Kisarazu; Seiji Suzuki; Masayuki Shimizu, both of Chiba, all of Japan

[73] Assignee: Sumitomo Chemical Company, Limited, Osaka, Japan

[21] Appl. No.: 103,923

[22] Filed: Dec. 17, 1979

[30] Foreign Application Priority Data

Dec. 26, 1978 [JP] Japan ............................. 53-161710

[51] Int. Cl.³ .................. C08F 2/02; C08F 4/28; C08F 10/02
[52] U.S. Cl. ........................ 526/65; 526/73; 526/352.2
[58] Field of Search ............................. 526/65

[56] References Cited

U.S. PATENT DOCUMENTS

| 3,575,950 | 4/1971 | Gleason et al. | 526/65 |
| 3,875,128 | 4/1975 | Suzuki et al. | 526/65 |
| 4,123,600 | 10/1978 | Kita et al. | 526/65 |

Primary Examiner—Edward J. Smith
Attorney, Agent, or Firm—Stevens, Davis, Miller & Mosher

[57] ABSTRACT

An improved process for the high pressure polymerization of ethylene using a battery of two reactors in which the preceding autoclave reactor having two reaction zones is connected in series with the succeeding autoclave reactor having one reaction zone through a heat exchanger. This process has a high efficiency of polymerization initiator and gives a polyethylene excellent in optical properties and processability in a high reaction yield.

5 Claims, 4 Drawing Figures

PROCESS FOR PRODUCING POLYETHYLENE

This invention relates to an improved process for producing low density polyethylene and more particularly it relates to an improved high pressure polymerization process for the production of ethylene using a battery of two reactors in which a preceding autoclave reactor having two reaction zones is connected in series with a succeeding autoclave reactor having one reaction zone through a heat exchanger.

Polyethylene is industrially produced by a variety of processes and there are commercially available many types of polyethylene having their own peculiar properties. These different types of polyethylenes are usually classified according to the density of the polymer as low density polyethylene, medium density polyethylene or high density polyethylene. Among them, the low density polyethylene, having a density within the range from 0.900 to 0.935 g/cm³ is widely used as films for wrapping and packaging.

The low density polyethylene used for these purposes is essentially required to have excellent optical properties, stiffness and processability. For the production of low density polyethylenes having such properties by means of an autoclave reactor, there is known two-reaction zone processes in which the polymerization is carried out in the first and second reaction zones at different polymerization temperatures, and such processes are disclosed, for example, in U.S. Pat. Nos. 3,536,693 and 3,875,128.

However, if the two-zone polymerization is carried out according to the method described in U.S. Pat. No. 3,875,128, there occur the following problems.

As is well known, when the reaction is carried out on an industrial scale, the reaction yield (percent of the produced polymer weight per unit weight of feed monomer supplied into the reactor) of polyethylene is determined by the following heat balance in the reactor:

| Quantity of generated polymerization heat (heat of polymerization × reaction yield × ethylene feed rate) | = | Ethylene feed rate × difference in sensible heat | + | Quantity of heat removal from the outside |

Thus, the reaction yield increases in proportion both to the difference in sensible heat and to the quantity of heat removal from the outside.

Also, in the above two-zone polymerization process, a high pressure polymerization of ethylene is practised in the first reaction zone and the second reaction zone at different temperatures so as to produce polyethylene with excellent optical properties and processability. Usually, the reaction temperature in the first reaction zone is as low as 140°–200° C.

Accordingly, in the process described in U.S. Pat. No. 3,875,128, the difference in sensible heat is determined if the feed temperature of ethylene at the inlet of the reactor and the discharging temperature of reaction mixture at the outlet of the reactor are given. However, the quantity of heat removal from the outside is proportional to the difference between the reaction temperature in the preceding autoclave reactor and the temperature of reaction mixture cooled by the heat exchanger. Therefore, in the practice of the above two-zone polymerization process, the reaction temperature in the preceding autoclave reactor is usually as low as described above and the temperature of reaction mixture after being cooled by the heat exchanger cannot be lower than 120° C., so that the quantity of heat removal from the outside is very small and the increase in reaction yield of polyethylene is small, which is a fault of the two-zone polymerization process.

The present inventors previously disclosed in U.S. Pat. No. 4,123,600 a process for overcoming such a fault and further increasing the reaction yield of polyethylene.

The above-mentioned process was a high pressure polymerization process of ethylene using two or more autoclave reactors having two reaction zones. However, the above-mentioned process had the following fault.

That is, in an autoclave reactor to which the complete mixing model is approximately applicable, the efficiency of polymerization initiator $\eta$ (the number of moles of ethylene polymerized per 1 mole of polymerization initiator) is approximately expressed by the following equation:

$$\eta \propto \theta \cdot e^{-\frac{1}{RT}(2E_p - E_t)} \quad (1)$$

wherein:
$\theta$ is a mean residence time in the reaction part,
R is a gas constant,
T is a reaction temperature (absolute temperature, K),
$E_p$ is an activation energy of propagation in the polymerization and
$E_t$ is an activation energy of termination in the polymerization,
regardless of the kind of polymerization initiator.

Therefore, the lower the reaction temperature is, the lower the efficiency of polymerization initiator is.

The process of U.S. Pat. No. 4,123,600 has the fault that the efficiency of polymerization initiator in the first reaction zone is low because reaction temperature in the first reaction zone of each autoclave reactor is usually as low as 140°–200° C. as mentioned above.

According to the process of this invention, the above-described fault can be overcome.

An object of this invention is to provide an improved process for producing low density polyethylene.

Another object of this invention is to provide a reaction apparatus giving a high efficiency of polymerization initiator in the production of low density polyethylene.

Other objects and advantages of this invention will become apparent from the following description.

According to this invention, a process for polymerizing ethylene at a high temperature and a high pressure using two autoclave reactors connected in series through a heat exchanger, there is provided a process for producing polyethylene which comprises using the preceding autoclave reactor partitioned into a first and second reaction zones and the succeeding reactor having one reaction zone, feeding the major part of the starting ethylene into the first reaction zone of the preceding autoclave reactor, feeding the remaining starting ethylene into the succeeding autoclave reactor, polymerizing the ethylene fed into the first reaction zone of the preceding autoclave reactor in the presence of a polymerization initiator under a pressure of 1,000–2,800 kg/cm² at a temperature of 130°–200° C., introducing the reaction mixture thus obtained into the second reaction zone of the preceding autoclave reactor, polymerizing the reaction mixture in the presence of a polymerization initiator at a temperature of 210°–280° C., cooling the reaction mixture discharged from the second reaction zone of the preceding autoclave reactor by means of the heat exchanger to a temperature which is not lower than 120° C. and is 20° C. or more lower than the reaction temperature in the second reaction zone of the preceding autoclave reactor, feeding the cooled mixture into the succeeding autoclave reactor and polymerizing it there in the presence of a polymerization initiator under a pressure of 1,000–2,800 kg/cm² at a temperature of 210°–280° C.

According to the process of this invention, the reaction temperature in the succeeding autoclave reactor is 210°–280° C. which is higher than the reaction temperature of 130°–200° C. in the first reaction zone of the succeeding autoclave reactor in the process disclosed in U.S. Pat. No. 4,123,600, so that this invention is superior to U.S. Pat. No. 4,123,600 in efficiency of polymerization initiator in such reaction zone.

The improved efficiency of polymerization initiator achievable by the process of this invention brings about a decreased quantity of polymerization initiator to be used, and its economical and commercial value is great.

Figure 2:
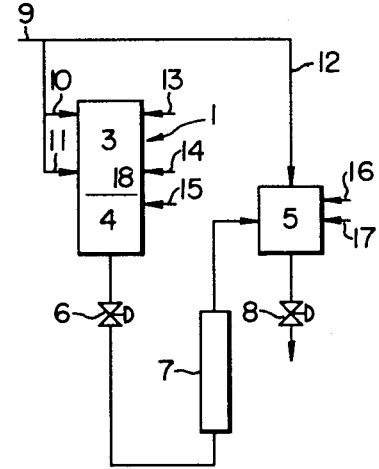
Figure 3:
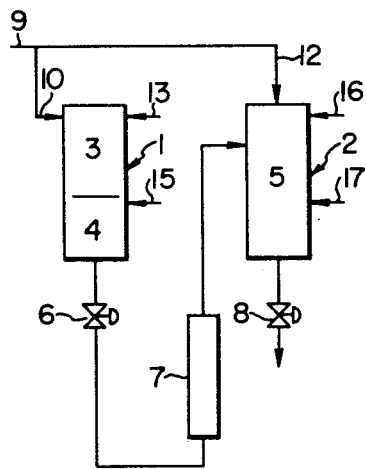
Figure 4:
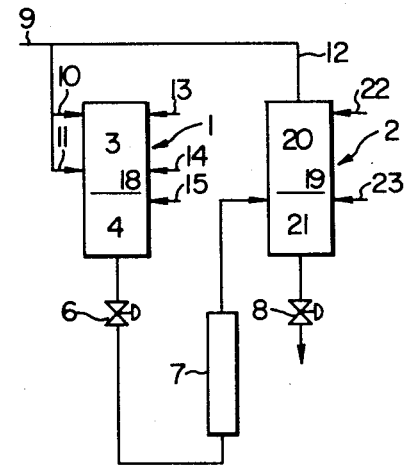

Among the accompanying drawings,

FIGS. 1, 2 and 3 are schematic diagrams of the preferred forms of reactors used in the practice of the process of this invention, and FIG. 4 is a schematic diagram of reactor shown for a comparison.

In the drawings, significances of the numerical symbols are as follows:

1, 2 . . . autoclave reactor,
3, 20 . . . first reaction zone of autoclave reactor 1,
4, 21 . . . second reaction zone of autoclave reactor 1,
5 . . . reaction zone of autoclave reactor 2,
6, 8 . . . pressure-control valve,
7 . . . heat exchanger,
9, 10, 11, 12 . . . piping for injecting starting ethylene,
13, 14, 15, 16, 17, 22, 23 . . . piping for injecting polymerization initiator,
18, 19 . . . baffle.

Next, the details of this invention will be explained below.

In practising this invention, ethylene is polymerized at different reaction temperatures in the first reaction zone and the second reaction zone which are formed by partitioning the reaction zone of the preceding autoclave reactor with a baffle (partition plate) or some other partition means.

In practising the process of this invention, the volume ratio of the first reaction zone to the second reaction zone of the preceding autoclave reactor may not necessarily be 1 (that is, the first and second reaction zones need not be equal in volume).

Thus, equation (1) indicates that, if the mean residence time of ethylene in the first reaction zone is prolonged while maintaining the feed of ethylene into the reactor constant for the sake of improving the efficiency of polymerization initiator in the first reaction zone of the preceding autoclave reactor, the efficiency of polymerization initiator is improved nearly in proportion to the mean residence time.

Based on equation (1), the above-mentioned volume ratio can be made greater than 1.

However, there is naturally an upper limit to said volume ratio, and it is practically impossible to elevate such volume ratio higher than 6 for the following reason. Generally, polymerization of ethylene generates heat to about 800 cal/g, and in the polymerization process using an autoclave reactor or reactors, removal of such polymerization heat is effected by means of the difference in sensible heat between the reaction mixture withdrawn from the reactor and the cold ethylene supplied as starting material, so that if the volume ratio of the first to second reaction zone is increased too much while maintaining the feed of ethylene constant, the quantity of ethylene polymerization heat generated within the average residence time becomes smaller than the heat quantity required for raising the temperature of ethylene introduced into the second reaction zone (more accurately, the 130° to 200° C., reaction mixture reacted in the first reaction zone) to the desired level in the second reaction zone, making it impossible to raise the temperature to the desired level in the second reaction zone.

As is apparent from the foregoing discussion, the upper limit of said volume ratio can vary as it is a function of the reaction temperature in the second reaction zone, the type of polymerization initiator used, the capacity of the reactor used, and the ethylene feed rate, but when we consider the feed rate of ethylene and capacity of the autoclave reactors generally used in the current polyethylene production processes, the upper limit of said volume ratio is safely given at 6.

Total volume of the preceding autoclave reactor (sum of the volume of first reaction zone and the volume of second reaction zone) may be greater than the volume of the succeeding autoclave reactor. However, the total volume of the preceding autoclave reactor should be limited to the range of 1–6 times the volume of the succeeding autoclave reactor for the same reason as the above-described reason why the volume ratio of first reaction zone to second reaction zone in the preceding autoclave reactor should be 1–6.

In this invention, the major part of starting ethylene is fed into the first reaction zone of the preceding autoclave reactor, wherein the term "the major part of starting ethyelene" means 60% or more, preferably 70 to 90% of the total starting ethylene.

When the feed of ethylene into the first reaction zone of the proceding reactor is less than 60%, the quality of obtained polyethylene is undesirably degraded.

In this invention, reaction pressure and reaction temperature mentioned below are preferable from the viewpoint of quality of polyethylene formed.

As for reaction pressure, it should be selected from within the range of 1,000–2,800 kg/cm², preferably 1,100–2,500 kg/cm².

Regarding the reaction pressure in this invention, the value obtainable by deducting the pressure loss in the piping leading from the preceding autoclave reactor to the succeeding autoclave reactor from the reaction pressure in the preceding autoclave reactor is equal to the maximum pressure in the succeeding autoclave reactor, which can be suitably adjusted in the above-mentioned range by operating the pressure-control valve provided at the outlet of the preceding autoclave reactor.

In this invention, the reaction temperature is 130°–200° C., preferably 140°–180° C. in the first reaction zone of the preceding autoclave reactor, and is 210°–280° C., preferably 220°–270° C. in the second reaction zone.

The reaction temperature in the succeeding autoclave reactor is 210°–280° C., preferably 215°–275° C.

In practising the process of this invention, if two or more feed inlets are provided for each of starting ethylene and polymerization initiator, to be fed into the first reaction zone of the preceding autoclave reactor, along the length of the reactor, the polyethylene obtained can be further excellent and superior to the products of prior processes in optical properties and processability.

Though polymerization initiator may be fed from the same feed inlet as that for starting ethylene, it may also be fed from a different feed inlet from that for starting ethylene.

A variety of combinations of the positions of inlets of feed ethylene and polymerization initiator into the first reaction zone are possible. In order to obtain a polyethylene having excellent optical properties and processability, however, the combination should be determined so that the distribution of reaction temperature in the first reaction zone becomes as uniform as possible, which is easy to do for those skilled in the art.

In this invention, the reaction mixture discharged from the end of the second reaction zone of the preceding autoclave reactor is cooled by means of a heat exchanger provided between the preceding and succeeding autoclave reactors to a temperature which is not lower than 120° C. and is 20° C. or more lower than the reaction temperature in the second reaction zone of the preceding reactor. The cooled mixture is introduced into the succeeding autoclave reactor.

In the succeeding reactor, the cooled mixture and the remaining starting ethylene in an amount of 40% or less, preferably 10 to 30% are polymerized in the presence of a polymerization initiator.

The reaction temperature in the succeeding autoclave reactor is 210°–280° C., preferably 215°–275° C., as described above. However, depending on the nature of the reaction mixture and the combination of feed inlets for the remaining ethylene and polymerization initiator, the reaction temperature at the bottom of the succeeding autoclave reactor may be 0°–70° C. higher than that in its upper part.

Even if, there is a difference in reaction temperature between the upper part and the bottom of the succeeding autoclave reactor, the optical properties of the resulting polyethylene film are not deteriorated.

The polymerization initiator used in the first reaction zone of the preceding autoclave reactor is preferably one having a decomposition temperature of 40°–80° C. to obtain a half lifetime of 10 hours, and examples of such initiators include diisopropyl peroxydicarbonate, di-2-ethylhexyl peroxydicarbonate, tert-butyl peroxypivalate, 3,5,5-trimethylhexanoyl peroxide, octanoyl peroxide, decanoyl peroxide, lauroyl peroxide, propionyl peroxide, tert-butyl peroxy-2-ethylhexanoate, tert-butyl peroxyisobutyrate and the like.

Usually, the amount of polymerization initiator used for the polymerization of ethylene in the first reaction zone of the preceding autoclave reactor is 50–1,000 parts by weight per 1,000,000 parts by weight of ethylene.

The polymerization initiator used in the second reaction zone of the preceding autoclave reactor and in the succeeding autoclave reactor is one having a decomposition temperature of 70°–140° C. to obtain a half lifetime of 10 hours, and examples of such initiators include tert-butyl peroxy-2-ethylhexanoate, tert-butyl peroxyisobutyrate, tert-butyl peroxylaurate, tert-butyl peroxyisopropylcarbonate, tert-butyl peroxyacetate, tert-butyl peroxybenzoate, dicumyl peroxide, tert-butyl hydroperoxide, di-tert-butyl peroxide and the like.

Usually, the amount of polymerization initiator used for polymerizing ethylene in the second reaction zone of the preceding autoclave reactor and in the succeeding autoclave reactor is 5–500 parts by weight per 1,000,000 parts by weight of ethylene.

In this invention, the polymerization initiator used in the first and second reaction zones of the preceding reactor and the succeeding reactor may be one kind of polymerization initiator or a mixture of two or more kinds of polymerization initiators.

The starting ethylene in this invention may contain a known chain transfer agent usually in an amount of 0.1–10% by mole based on ethylene.

As said chain transfer agent, there can be used paraffins such as ethane, propane, butane, pentane, hexane and heptane; α-olefins such as propylene, butene-1, hexene-1 and 3-methylpentene-1; aldehydes such as formaldehyde, acetaldehyde and propionaldehyde; ketones such as acetone, methyl ethyl ketone, diethyl ketone and cyclohexanone; aromatic hydrocarbons such as benzene, toluene and xylene; and the like, either alone or as mixture of two or more members.

By the process of this invention, the efficiency of the polymerization initiator can be improved and, in addition, there is obtained polyethylene excellent in optical properties and processability and having a high commercial value.

Next, examples and comparative example of this invention will be illustrated with reference to the accompanying drawings. This invention is not limited by these examples.

EXAMPLE 1

In FIG. 1, 88 kg/hour of ethylene containing 0.8% by volume of ethane as a chain transfer agent compressed to a pressure of 1,300 kg/cm$^2$ from piping 9 was fed into the first reaction zone 3 of the preceding autoclave reactor 1 through pipings 10 and 11 at the rates of 22 kg/hour and 44 kg/hour, respectively, while the remaining 22 kg/hour of ethylene was fed into the succeeding autoclave reactor through piping 12.

The preceding autoclave reactor 1 was partitioned into the first reaction zone 3 and the second reaction zone 4 by baffle 18, and the volume ratio of the first reaction zone to the second reaction zone was 1.

The total volume of the preceding autoclave reactor was equal to the volume of the succeeding autoclave reactor.

Each of the reactors was provided with an agitator for agitating the reaction mixture, which is not shown in the figures, and said baffle was fixed on this agitator.

Into the first reaction zone 3, was fed 33.4 g/hour of octanoyl peroxide as a polymerization initiator through pipings 13 and 14, and polymerization of ethylene was carried out under a reaction pressure of 1,300 kg/cm$^2$ at a reaction temperature of 170° C.

The reaction mixture in the first reaction zone 3 was led to the second reaction zone 4 and the mixture was polymerized at 260° C. while feeding 2.1 g/hour of di-tert-butyl peroxide as a polymerization initiator through piping 15, after which it was discharged from the bottom of preceding autoclave reactor 1, passed through pressure-control valve 6 and was introduced into heat exchanger 7.

The reaction mixture was cooled to 140° C. by the heat exchanger 7 and then introduced into autoclave reactor 2.

In the reaction zone 5 of the succeeding autoclave reactor 2, 3.0 g/hour of tert-butyl peroxybenzoate and 1.7 g/hour of di-tert-butyl peroxide as polymerization initiators were fed through pipings 16 and 17, respectively, into the mixture of the reaction mixture which had been passed through the heat exchanger and the remaining starting ethylene which had been fed through piping 12, and the polymerization was carried out under a reaction pressure of 1,200 kg/cm$^2$ at a reaction temperature of 230° C. in the upper part of reactoin zone 5 and 260° C. at the bottom of reaction zone 5.

The reaction mixture discharged from the succeeding autoclave reactor 2 was decompressed to the ordinary separation pressure by pressure-control valve 8, and then separated into the formed polyethylene and the unreacted ethylene.

The unreacted ethylene was again compressed to the reaction pressure and then recycled into the reactor.

The quantity of the formed polyethylene was 19.4 kg/hour and the reaction yield of polyethylene was 22.1%. The density of the resulting polyethylene was 0.922 g/cm$^3$ as measured according to ASTM D-1505, and the melt index was 2 g/10 minutes as measured according to ASTM D-1238.

The haze and gloss of the polyethylene film were 2.9% and 130%, respectively, as measured according to ASTM D-1003 and ASTM D-523 and D-2103. As are apparent from the comparison with the following Comparative Example 1, these values of haze and gloss are comparable to the results of Comparative Example 1.

The film processability of this polyethylene into thin film was expressed by the minimum film thickness (unit $\mu$) which could be reached when the polyethylene was formed into film at a resin temperature of 160° C., and said value was 13$\mu$.

COMPARATIVE EXAMPLE 1

A comparison with Example 1 was practised in accordance with Example 1 using reactors as shown in FIG. 4. It differed from Example 1 in the following points. Thus, the content of ethane in the starting ethylene was 1.5% by volume.

The succeeding autoclave reactor 2 was partitioned into the first reaction zone 20 and the second reaction zone 21 by baffle 19.

In the second reaction zone 21 of the succeeding autoclave reactor, the reaction mixture which had been introduced through the heat exchanger was mixed with the reaction mixture formed by feeding 6.8 g/hour of octanoyl peroxide as a polymerization initiator through piping 22 into the starting ethylene which had been fed into the first reaction zone 20 of the reactor 2 and polymerizing under a reaction pressure of 1,200 kg/cm$^2$ at a reaction temperature of 170° C., and 4.6 g/hour of di-tert-butyl peroxide as a polymerization initiator was fed thereinto through piping 23 and the resulting mixture was polymerized at a reaction temperature of 260° C.

In this comparative example, the quantity of polyethylene formed was 19.4 kg/hour and the reaction yield of polyethylene was 22.1%. The density was 0.922 g/cm$^3$ and the melt index was 2 g/10 minutes. Haze and gloss of the obtained film were 2.8% and 130%, respectively, and the thin film processability was 13$\mu$.

EXAMPLES 2-7

Examples 2-7 were carried out in accordance with Example 1. The results of Examples 1-7 and Comparative Example 1 are summarized in the following table.

From comparison of Example 1 or 2 with Comparative Example 1, it is apparent that the film of polyethylene obtained by this invention is comparable to that of comparative example in optical properties (haze and gloss) and film processability and that the amount of polymerization initiator is smaller in this invention than in the comparative example. These results demonstrate the superiority of this invention.

TABLE

| | Example 1 | Comparative Example 1 | Example 2 | Example 3 |
| --- | --- | --- | --- | --- |
| Schematic diagram of reactor | FIG. 1 | FIG. 4 | FIG. 1 | FIG. 2 |
| Total volume of reactor 1/volume of reactor 2 | 2/2 | 2/2 | 2/2 | 4/2 |
| Volume ratio of 1st. reaction zone/2nd. reaction zone, in reactor 1 | 1/1 | 1/1 | 1/1 | 2/2 |
| Volume ratio of 1st. reaction zone/2nd. reaction zone, in reactor 2 | — | 1/1 | — | — |
| Quantity of starting ethylene fed (kg/hour): | | | | |
| through piping 10 | 22 | 22 | 22 | 22 |
| through piping 11 | 44 | 44 | 44 | 44 |
| through piping 12 | 22 | 22 | 22 | 22 |
| Chain transfer agent   Type | Ethane | Ethane | Ethane | Ethane |
| Concentration (% by volume) | 0.8 | 1.5 | 0.3 | 0.9 |
| Reaction pressure (kg/cm$^2$)   Reactor 1 | 1,300 | 1,300 | 1,300 | 1,300 |
| Reactor 2 | 1,200 | 1,200 | 1,200 | 1,200 |
| Reaction temperature (°C.) | | | | |
| 1st reaction zone/2nd reaction zone, in reactor 1 | 170/260 | 170/260 | 170/260 | 170/260 |
| upper reaction zone/bottom reaction zone, in reactor 2 | 230/260 | — | 260/260 | 230/260 |
| 1st reaction zone/2nd reaction zone, in reactor 2 | — | 170/260 | — | — |
| Outlet temperature of heat exchanger 7 (°C.) | 140 | 140 | 140 | 140 |
| Polymerization initiator (g/hour embraced: mole/hour) | | | | |
| through piping 13, 14 | A 33.4 | A 33.4 | A 33.4 | A 20.0 |
| through piping 15 | B 2.1 | B 2.1 | B 2.1 | B 1.3 |
| through piping 16 | D 3.0(0.015) | — | B ⎫ 3.2 | B ⎫ 3.2 |
| through piping 17 | B 1.7(0.012) | — | B ⎭ | B ⎭ |
| through piping 22 | — | A 6.8(0.024) | — | — |
| through piping 23 | — | B 4.6(0.032) | — | — |
| Reaction yield of polyethylene (%) | 22.1 | 22.1 | 22.0 | 22.1 |
| Density (g/cm$^3$) | 0.922 | 0.922 | 0.922 | 0.922 |

TABLE-continued

| | | | | |
|---|---|---|---|---|
| Melt index (g/10 minutes) | 2 | 2 | 2 | 2 |
| Optical properties  Haze (%) | 2.9 | 2.8 | 3.5 | 2.8 |
|  Gloss (%) | 130 | 130 | 120 | 130 |
| Film processability | 13 | 13 | 13 | 12 |

| | Example 4 | Example 5 | Example 6 | Example 7 |
|---|---|---|---|---|
| Schematic diagram of reactor | FIG. 3 | FIG. 1 | FIG. 2 | FIG. 1 |
| Total volume of reactor 1/volume of reactor 2 | 2/2 | 2/2 | 4/2 | 2/2 |
| Volume ratio of 1st. reaction zone/2nd. reaction zone, in reactor 1 | 1/1 | 2/1 | 3/1 | 1/1 |
| Volume ratio of 1st. reaction zone/2nd. reaction zone, in reactor 2 | — | — | — | — |
| Quantity of starting ethylene fed (kg/hour): | | | | |
|  through piping 10 | 77 | 33 | 33 | 22 |
|  through piping 11 | — | 44 | 44 | 44 |
|  through piping 12 | 11 | 11 | 11 | 22 |
| Chain transfer agent  Type | Pro-pylene, Propane | Propane | Propane | Propylene |
|  Concentration (% by volume) | 2.1, 3.3 | 1.3 | 2.3 | 2.8 |
| Reaction pressure (kg/cm$^2$)  Reactor 1 | 2,400 | 1,200 | 1,500 | 1,800 |
|  Reactor 2 | 2,200 | 1,100 | 1,300 | 1,300 |
| Reaction temperature (°C.) | | | | |
| 1st. reaction zone/2nd reaction zone, in reactor 1 | 175/250 | 160/250 | 165/230 | 160/220 |
| upper reaction zone/bottom reaction zone, in reactor 2 | 220/250 | 220/260 | 240/270 | 240/250 |
| 1st reaction zone/2nd reaction zone, in reactor 2 | — | — | — | — |
| Outlet temperature of heat exchanger 7 (°C.) | 150 | 140 | 150 | 150 |
| Polymerization initiator (g/hour embraced: mole/hour) | | | | |
|  through piping 13, 14 | C 7.0 | A 32.3 | A 8.5 | A 19.6 |
|  through piping 15 | D 0.3 | D 4.1 | D 1.4 | D 1.5 |
|  through piping 16 | D ⎫ 0.9 | D ⎫ 7.3 | D 2.3 | D ⎫ 1.1 |
|  through piping 17 | D ⎭ | D ⎭ | B 1.2 | D ⎭ |
|  through piping 22 | — | — | — | — |
|  through piping 23 | — | — | — | — |
| Reaction yield of polyethylene (%) | 21.3 | 22.5 | 22.4 | 20.2 |
| Density (g/cm$^3$) | 0.925 | 0.922 | 0.922 | 0.923 |
| Melt index (g/10 minutes) | 2 | 2 | 2 | 2 |
| Optical properties  Haze (%) | 4.5 | 2.8 | 5.3 | 6.8 |
|  Gloss (%) | 100 | 130 | 100 | 90 |
| Film processability | 12 | 13 | 13 | 11 |

(Notes)
A: Octanoyl peroxide
B: Di-tert-butyl peroxide
C: 3,5,5-Trimethylhexanoyl peroxide
D: tert-Butyl peroxy-benzoate

What is claimed is:

1. In a process for polymerizing ethylene at a high temperature and a high pressure using two autoclave reactors connected in a series through a heat exchanger, by using the preceding autoclave reactor partitioned into a first and second reaction zone, feeding the major part of the starting ethylene into the first reaction zone of the preceding autoclave reactor, feeding the remaining starting ethylene into the succeeding autoclave reactor, polymerizing the ethylene fed into the first reaction zone of the preceding autoclave reactor in the presence of a polymerization initiator under a pressure of 1,000–2,800 kg/cm$^2$ at a temperature of 130°–200° C., introducing the reaction mixture thus obtained into the second reaction zone of the preceding autoclave reactor, polymerizing the reaction mixture in the presence of a polymerization initiator at a temperature of 210°–280° C., cooling the reaction mixture discharged from the second reaction zone of the preceding autoclave reactor by means of the heat exchanger to a temperature which is not lower than 120° C. and is 20° C. or more lower than the reaction temperature in the second reaction zone of the preceding autoclave reactor, feeding the cooled mixture into the succeeding autoclave reactor and polymerizing it there in the presence of a polymerizing initiator under a pressure of 1,000–2,800 kg/cm$^2$, the improvement which comprises using a reactor having one reaction zone as the succeeding autoclave reactor and polymerizing the mixture fed into the succeeding autoclave reactor at a temperature of 210°–280° C.

2. A process according to claim 1, wherein the total volume of the preceding autoclave reactor is 1–6 times the volume of the succeeding autoclave reactor.

3. A process according to claim 1, wherein the volume ratio of the first reaction zone to the second reaction zone in the preceding autoclave reactor is 1–6.

4. A process according to claim 1, wherein the number of feed inlets for the starting ethylene and the polymerization initiator to be fed into the first reaction zone of the preceding autoclave reactor are respectively 2 along the length of the reactor.

5. A process according to claim 1, wherein the reaction temperature at the bottom of the succeeding autoclave reactor is 0°–70° C. higher than that in its upper part.

* * * * *